Patented Oct. 29, 1935

2,018,935

UNITED STATES PATENT OFFICE 2,018,935

POLY-HALOGEN-DERIVATIVES OF PYRENE AND A PROCESS OF PREPARING THEM

Heinrich Vollmann, Frankfort-on-the-Main-Hochst, and Hans Becker, Hofheim-on-the-Taunus, Germany, assignors to General Aniline Works, Inc., New York, N. Y., a corporation of Delaware No Drawing. Application September 1, 1933, Serial No. 687,914. In Germany September 10, 1932

5 Claims. (Cl. 260—61)

The present invention relates to poly-halogen-derivatives of pyrene and to a process of preparing them.

We have found that halogen-pyrene-quinones containing halogen which may easily be exchanged for other radicals, are obtainable by converting tetra- to hexa-chloropyrenes or the equivalent tetra- to hexa-bromopyrenes into poly-halogen-poly-hydropyrenes by the action of an excess of chlorine, if desired, transforming the latter into polyhalogen-pyrenes containing more than 4 halogen atoms by splitting off hydrogen halide and, if desired, causing mineral acids of an oxidizing action to act upon the said poly-halogenpyrenes.

By causing chlorine to act upon 3.5.8.10-tetrachloropyrene in trichlorobenzene at about 100° C., for instance, an individual tetrachloropyrene-tetrachloride which crystallizes well may be isolated without difficulties which product, owing to its behaviour, probably possesses the constitution of a 1,2,3,5,6,7,8,10-octochloro-1,2,6,7-tetra-hydropyrene (cf. Formula III of the following schedule). By causing chlorine to act upon 3,5,8,10-tetrabromopyrene, there is obtained a chlorine addition product having probably an analogous constitution. The preparation of the tetrahalogen-pyrenes and their subsequent chlorination to form the said polyhalogen-hydropyrenes may also be effected in a single operation as described in the following examples. By adding chlorine for a prolonged time at temperatures of 100° C. to 150° C., yellow halogenpyrenes containing more than 6 chlorine-atoms (octo- or decachloropyrene) are finally obtained.

Furthermore, we have found that by splitting off hydrogen halide from the octo-halogen-tetrahydropyrenes which may easily be isolated in a pure state, uniformly crystallizing hexa-halogenpyrenes are obtained. In the case of tetrachloropyrene-tetrachloride, the hydrogen halide is split off either by heating to temperatures above 250° C. or by treating with alkaline agents, for instance, mixing with alcoholic alkali, on a water bath, while stirring. Both methods yield the same hexachloropyrene, 2 mols of hydrogen chloride being eliminated. Though this hexachloropyrene crystallizes in the form of uniform long needles and has a constant melting point of 383° C., it does not appear to be an individual body because by its oxidative decomposition there are formed, side by side, two different dichloronaphthalene-1,4,5,8-tetracarboxylic acids (melting points of the anhydrides: 387° C. and 310° C., respectively). It is supposed that the product is a molecular compound of the two hexachloropyrenes represented by the Formulæ IV and V given below.

The hexahalogenpyrenes, thus obtained, or the polyhalogenhydropyrenes from which the said hexahalogenpyrenes are formed by splitting off hydrogen halide, as well as more highly halogenated pyrenes, such as octo- or decachloropyrenes, yield the new above named halogen-pyrenequinones when they are treated with mineral acids of an oxidizing action as, for instance, sulfuric acid, fuming sulfuric acid, nitric acid or mixtures thereof.

As far as may be concluded from the analysis and the chemical behaviour of the new pyrene derivatives, the reactions described above may be illustrated by the following formulæ:

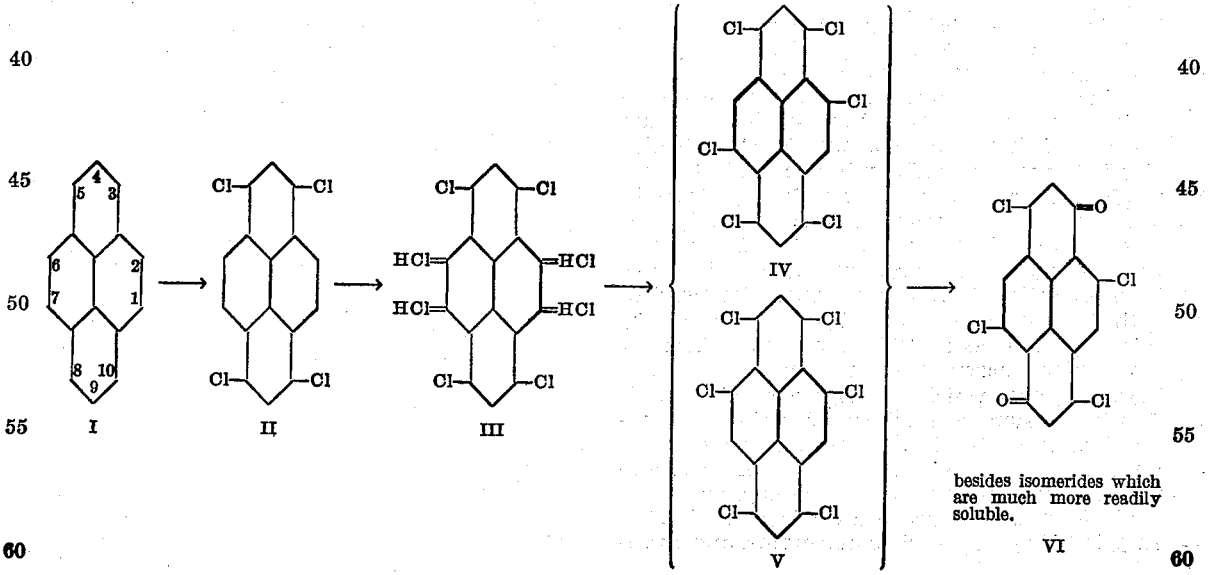

besides isomerides which are much more readily soluble.

besides isomerides which are much more readily soluble.

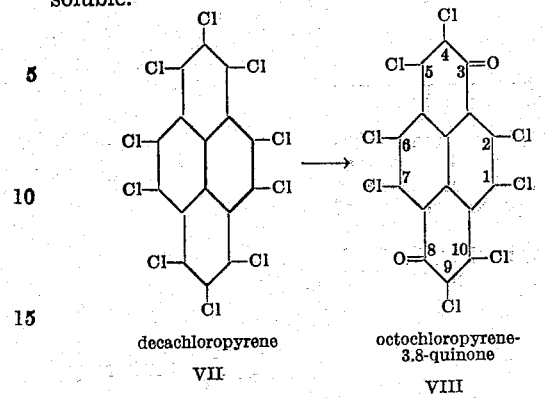

decachloropyrene
VII octochloropyrene-3.8-quinone
VIII

The products obtainable according to the process of this invention are new; for instance, products are obtained which probably have the following formula:

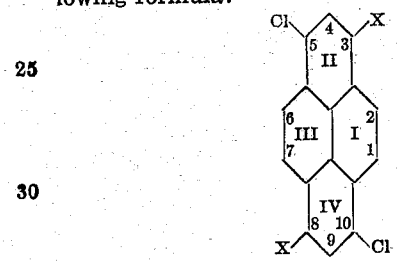

wherein X stands for chlorine or oxygen, containing one, two or three pairs of further chlorine atoms, the members of the single pairs standing not in the same nucleus but in opposite nuclei I and III or II and IV, respectively.

The new pyrene derivatives described are starting materials as well as intermediate products for the preparation of dyestuffs. Colored compounds of a vat dyestuff character are, for instance, obtained by the exchange of chlorine in tetrachloropyrenequinone for basic radicals. The octohalogen-tetrahydropyrenes, the hexahalogenpyrenes or the quinones obtainable therefrom may also be transformed by oxidation into hitherto unknown dihalogen derivatives of the naphthalene-1, 4, 5, 8-tetracarboxylic acid and the latter into new vat dyestuffs by condensation with aromatic otho-diamines.

The following examples serve to illustrate the invention, but they are not intended to limit it thereto, the parts being by weight:

(1) 68 parts of 3, 5, 8, 10-tetrachloropyrene (melting at 368° C., crystallizing from nitrobenzene in the form of colorless needles) are suspended in 1000 parts of commercial trichlorobenzene; the whole is heated up to about 100° C. and chlorine is introduced, while well stirring. The suspended product gradually dissolves entirely in the course of some hours. The slightly yellowish clear solution is allowed to cool and the thick colorless crystals glittering like glass which have been precipitated are filtered by suction, washed with benzene and dried. The product is obtained with a good yield. By recrystallizing it from chlorobenzene, there are obtained colorless heavy crystals which decompose at about 290° C. while assuming a yellow coloration and losing hydrogen chloride. It is, according to the analysis and behaviour, a tetrachloropyrene-tetrachloride (octochlorotetrahydropyrene).

(2) 50 parts of pyrene are added, while stirring, to 1500 parts of trichlorobenzene, and a rapid current of chlorine is introduced into the solution, whereby the temperature rises by itself from room-temperature up to 60° C. to 70° C. An increasing crystalline precipitation of chlorinated pyrene takes place so that the reaction mixture becomes a thick magna. The recrystallized product finally consists of nearly pure 3, 5, 8, 10-tetrachloropyrene. The temperature is then raised to about 100° C. and the introduction of chlorine is continued while well stirring. The product is further worked up as described in Example 1. About 70 parts of practically pure tetrachloropyrene-tetrachloride are obtained.

(3) 50 parts of tetrabromopyrene (crystallizing from nitrobenzene in the form of faintly yellow needles, melting at 402° C., uncorrected) are suspended in 1200 parts of trichlorobenzene and the suspension is treated with chlorine at a temperature not exceeding 120° C., while stirring very quickly. After 3 to 4 hours the small needles of tetrabromopyrene have disappeared and the precipitation of colorless brilliant heavy crystals sets in. The whole is allowed to cool, filtered by suction, washed with benzene and dried. By recrystallizing the products thus obtained, from chlorobenzene, thick brilliant colorless crystals are obtained. When heated to about 290° C. the polybromopyrene-polychloride, thus formed, decomposes with elimination of hydrogen bromide.

(4) 101 parts of pyrene are added while stirring to 1800 parts of nitrobenzene, and 330 parts of bromine are further added within about 1 hour. Even at a temperature as low as 20° C. evolution of hydrogen bromide sets in. In order to finish the bromination, the whole is heated at 120° C. to 150° C. until hydrogen bromide no longer escapes. Thus, pure tetrabromopyrene has been formed; the yield amounts to 95% of that of the theory.

When all of the hydrogen bromide has been dispelled by heating, if necessary by passing a current of nitrogen through the suspension, chlorine is introduced at 100° C. to 110° C. into the suspension, thus obtained, and the whole is further treated as described in the preceding example. The product obtained is the polybromopyrene-polychloride described in Example 3.

(5) 300 parts of tetrachloropyrene-tetrachloride (obtainable according to Example 1 or 2) are heated to 390° C. for a short time in a bath of molten metal. At about 300° C. hydrogen chloride escapes and the product assumes a yellow coloration. At 390° C. the whole is molten and the evolution of gas is finished. The product which, on cooling, solidifies in a crystalline form, is practically pure hexachloropyrene. By sublimation under reduced pressure or recrystallization from nitrobenzene, the hexachloropyrene is obtained in the form of long yellowish needles, melting at 383° C.

The same hexachloropyrene is obtained by treating tetrachloropyrene-tetrachloride with basic agents, for instance, by boiling it with quinoline or by mixing it with alcoholic caustic potash or caustic soda between 100° C. and 130° C., while stirring. The yield of the pure product exceeds 90% of that of the theory.

(6) By heating as described in Example 5 the polybromopyrene-polychloride, obtainable according to Examples 3 and 4, hydrogen bromide is split off. When the evolution of gas is finished, the whole is allowed to cool down whereby the product solidifies in a crystalline form; when recrystallized from nitrobenzene it forms long brilliant needles, melting at above 300° C. The product obtained is a polybromo-chloropyrene.

Hydrogen bromide may be eliminated from polybromopyrene-polychloride even by boiling a solution of the latter in nitrobenzene or trichlorobenzene and, of course, also by means of basic agents, such as alcoholic caustic potash or caustic soda.

(7) 100 parts of finely powdered hexachloropyrene (obtainable according to Example 5) are introduced, while stirring and externally cooling, into 450 parts of nitric acid of specific gravity 1.5, the temperature not being allowed to rise above 25° C. The hexachloropyrene immediately dissolves in the nitric acid and after a short time red-orange small needles precipitate. The whole is further stirred at 10° C. to 20° C. for a short time and diluted with 200 parts of glacial acetic acid; the solid matter is filtered by suction, washed with glacial acetic acid, then with water and dried. The product is obtained with a good yield.

Concluding from the analysis and the chemical behaviour it probably is the 2,5,7,10-tetrachloropyrene-3,8-quinone of the following formula:

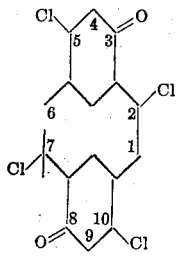

It crystallizes from nitrobenzene or chlorobenzene in the form of orange-red brilliant needles, melting at 320° C. to 325° C., according to the rapidity of the heating. The tetrachloroquinone dissolves in concentrated sulfuric acid to an olive solution, a thick layer of which has by transmitted light a brown-red coloration. It dissolves in an alkaline hydrosulfite solution to a clear light-yellow solution from which Bordeaux-red, greenish small needles precipitate when it is shaken with air. The needles have a metallic luster and probably constitute a quinhydrone-like compound. The tetrachloroquinone is re-obtained therefrom by a treatment with acid oxidizing agents. The tetrachloropyrenequinone described is transformed by a strong oxidation into an individual (probably 2,6) dichloronaphthalene-1,4,5,8-tetracarboxylic acid, the anhydride of which crystallizes from nitrobenzene in the form of colorless brilliant laminæ, melting at 387° C.

(8) 40 parts of hexachloropyrene (obtainable according to Example 5) are introduced, while stirring, into 400 parts of fuming sulfuric acid of 20% of $SO_3$, whereby a violet solution is obtained. The whole is then heated to 90° C. for about 1 hour, whereby the color of the solution turns to olive (by transmitted light: brown-red). By pouring the solution into ice water, there are obtained orange flakes which are filtered by suction, washed until neutral and dried.

The chloroquinone obtained with a very good yield behaves in a manner similar to that described in the preceding example.

(9) Apparently the same product is obtained by mixing, while stirring, at 100° C. for 1 hour 48 parts of tetrachloropyrene-tetrachloride (obtainable according to Example 1 or 2) with 250 parts of fuming sulfuric acid of 20% of $SO_3$. By pouring the whole into water, brownish-orange flakes are obtained which are filtered by suction, washed and dried. About 34 parts of a chloroquinone are obtained which dissolves in an alkaline hydrosulfite solution to a yellow solution and, moreover, is very similar to the final product of Example 7.

(10) 75 parts of hexachloropyrene (obtainable according to Example 5) are suspended in 1000 parts of chlorosulfonic acid previously cooled down to 0° C.; 3 parts of finely pulverized iodine are added to the suspension and chlorine is introduced, while stirring, at 0° C. for about 5 hours. The starting material has then disappeared and a new chlorination product is precipitated in the form of colorless crystals. It is filtered by suction through a stone filter and the solid matter is washed with chlorosulfonic acid; the residue is mixed with water, while stirring, and again filtered by suction; the solid matter is washed until neutral and dried. The product, thus obtained, crystallizes from chlorobenzene in the form of colorless brilliant crystals; it contains about 70% of chlorine and, when heated to about 280° C., hydrogen chloride and chlorine are split off.

62 parts of the perchloropyrene, thus obtained, are heated at 280° C. to 300° C., until in the melt evolution of gas no longer takes place. On cooling, the melt solidifies to form long brownish-yellow clustering crystals. The yield amounts to 50 to 54 parts. The decachloropyrene, thus obtained, crystallizes from benzene in the form of brilliant yellow plates which, on drying, lose their luster. The melting point is constant at 264° C. The content of chlorine has been found: 64.97%; calculated: 64.86%.

The decachloropyrene is insoluble in cold concentrated sulfuric acid, fuming sulfuric acid of 20% of $SO_3$ and chlorosulfonic acid.

(11) 20 parts of decachloropyrene (obtainable according to the statements of the preceding example) are ground at ordinary temperature in a ball mill with 150 parts of nitric acid (specific gravity: 1.5) until the yellow starting material is entirely transformed into the orange-red quinone. If necessary, the reaction may be accelerated by some heating. The quinone precipitate is filtered by suction through a stone filter or a glass filter; the solid matter is washed with glacial acetic acid and then with water, and finally dried. The yield amounts to about 10 parts of quinone. By recrystallization from chlorobenzene the octochloro-pyrenequinone (probably octochloro-pyrene-3,8-quinone), thus prepared, is obtained in the form of long brilliant orange-red needles, melting at 304° C. The product gradually dissolves in concentrated sulfuric acid to a Bordeaux-red solution which, when heated to higher temperatures, assumes a yellow-brown color with evolution of hydrochloric acid gas.

(12) 47 parts of octochloropyrene (obtainable by concentrating the trichlorobenzene mother-liquor which remains after filtration by suction of the tetra-chloropyrene-tetrachloride according to Examples 1 and 2; crystallizing from xylene in the form of long yellow needles melting at 240° C.; content of chlorine found: 59.05%, calculated for octochloropyrene: 59.38%) are treated with concentrated nitric acid in the same manner as stated in the preceding example for the decachloropyrene. The quinone isolated in the same manner (the yield amounts to 20 to 25 parts) crystallizes from chlorobenzene in the form of red-orange needles; it dissolves in an alkaline hydrosulfite solution to a yellow solution and has the content of chlorine calculated for a hexachloropyrenequinone.

We claim:

1. The compounds of the general formula:

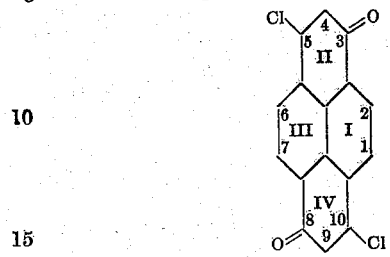

containing one, two or three pairs of further chlorine atoms, the members of the single pairs standing not in the same nucleus but in opposite nuclei I and III or II and IV, respectively.

2. The compound of the formula:

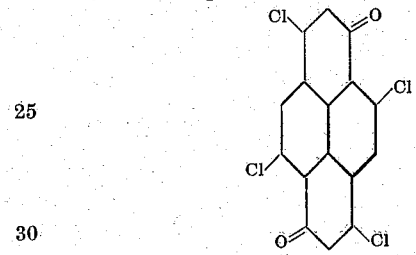

crystallizing from nitrobenzene or chlorobenzene in the form of orange-red brilliant needles, melting at 320° C. to 325° C.

3. The compound of the formula:

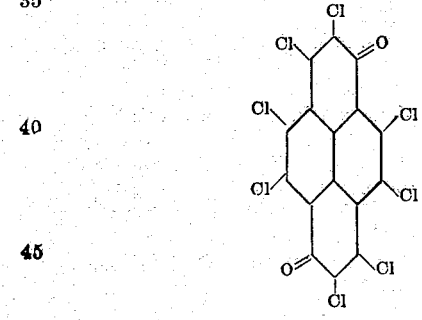

crystallizing from chlorobenzene in the form of long brilliant orange-red needles, melting at 304° C.

4. The process which comprises chlorinating a compound of the following formula:

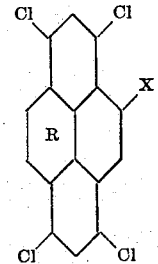

wherein X represents hydrogen or chlorine and wherein the nucleus R may contain one further chlorine atom, heating the polychlorine product, thus obtained up to a temperature from about 300° C. to about 400° C. until the evolution of hydrogen chloride is finished and treating the compounds, thus obtained with an oxidizing acting mineral acid.

5. The process which comprises chlorinating a compound of the following formula:

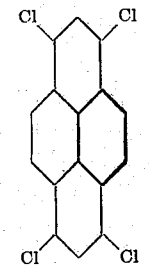

heating the tetrachloropyrene - tetrachloride, thus obtained, for a short time up to about 390° C. until the evolution of hydrogen chloride is finished and treating the hexachloropyrene, thus obtained, with nitric acid of specific gravity 1.5 at a temperature below 25° C.

HEINRICH VOLLMANN.
HANS BECKER.